United States Patent Office 2,933,426
Patented Apr. 19, 1960

2,933,426
BRAZING PASTE

Paul D. Johnson, Gary, Ind., assignor to The Glidden Company, Cleveland, Ohio, a corporation of Ohio No Drawing. Application January 18, 1955
Serial No. 482,664

4 Claims. (Cl. 148—23)

This invention relates to improvements in brazing pastes and relates particularly to brazing pastes which are characterized by non-corrosive qualities which permit them to be packed and then stored for long periods of time in iron containers.

Heretofore, brazing pastes of the types prepared in accordance with the Klinker U.S. Patents Nos. 2,566,339, 2,594,313 and 2,606,132 have in some instances been found to be very corrosive to ferrous metals under conditions of prolonged contact, thus making it difficult to store the paste in ferrous equipment which is used in applying the pastes to the work which is to be brazed. I have now found that this undesired corrosion of iron and other ferrous metal containers and equipment can be substantially or completely overcome by the simple but unexpected and unobvious expedient of formulating the pastes with sufficient added alkaline material to establish and maintain an alkaline pH in any aqueous environment of the paste.

Accordingly, it is an object of this invention to provide improved brazing pastes containing small, stable amounts of alkaline material disseminated therethrough.

Another object is to overcome the corrosive qualities of prior brazing pastes by adding sufficient alkaline material to establish a small stable amount of disseminated alkaline material therein.

These and other objects will be apparent from the following description and examples of my invention.

Brazing pastes using copper oxide as the source of part or all of the molten brazing metal needed in preparing a brazed joint have been found in my investigations to exhibit corrosive qualities in respect to ferrous metals when the copper oxide contains more than trace amounts of chlorides. The chlorides originate mainly in the preparation of copper oxide(s) from chloride-contaminated antecedant materials. While it is possible to reduce the amount of chlorides in the copper oxide(s) by appropriate selection of the antecedant raw materials, or by after-treatments of the copper oxide(s), it is economically impractical to use only chloride-free oxides in the preparation of brazing pastes on a commercial basis. I have found that it is economically more satisfactory to overcome the corrosive qualities of the chloride-containing pastes by adding alkaline materials, such as caustic soda, ammonia, sodium carbonate, or the like, in sufficient quantity to impart to the paste a permanently stable alkaline content.

Corrosive qualities in the brazing pastes prepared in accordance with U.S. Patent No. 2,594,313 are also due to the presence of the fluxes and other inorganic additives there described. Some of the inorganic materials impart an acid pH or acidic content to the pastes, and such acidity engenders corrosion of ferrous metals. Again, by adding alkaline material sufficient in amount to establish a permanent alkaline content, the corrosive nature of the compositions can be largely or totally overcome.

I have also found that the addition of alkaline materials to the brazing pastes of the Klinker patents supra gives no harmful or undesirable effects on the brazing functions of the pastes. Moreover, I have found that in practically all instances the added alkaline material and/or the stable alkaline content improves the dispersing and stability qualities of the pastes, thereby further enhancing their desired non-settling qualities.

Any alkaline-reacting material, either organic or inorganic, can be used to establish the desired stable alkaline content in the pastes, such as ammonia, organic amines, soda ash, borax and other alkali metal salts of weak acids, alkali metal hydroxides, lime, magnesia, etc. Volatile materials, such as ammonia, are less desirable, however, than the materials which are non-volatile at room temperatures, since their volatility can result in gradual loss of the desired alkaline content, especially when the pastes are stored and/or used in open containers. Moreover, the resulting odor of the volatile material(s) can be undesirable especially on a production line where large quantities of the paste are applied and ventilating conditions may not be adequate to remove the odor of the volatile material. While the non-volatile alkaline materials are apt to increase the total residue left on the work at the conclusion of the furnace brazing operation, I have found that the slight increase in residue is usually of no great significance and is more than offset by the advantages which attend the use of the materials. Cost is a prominent factor to be considered in selecting the alkaline material which is to be used, and sodium hydroxide is the material which I prefer because of its low cost, as well as for the reason that it is a strong base and consequently is needed in a lower total quantity than would be the case where weaker bases are employed. Moreover, sodium hydroxide is compatible with most of the pastes and engenders no undesirable side reactions such as may be encountered where lime or magnesia is used with certain gel-forming compounds of the vehicle. For these reasons sodium hydroxide is used in many of the following examples. It should be recognized, however, that it exemplifies the use of any alkaline material in accordance with the principles herein set forth.

It should be understood that any of the vehicles and any of the brazing materials described in the Klinker patents supra can be used in preparing the improved pastes which constitute the present invention. As described in those patents, the vehicle can be either aqueous or non-aqueous, and preferably is a gel having a consistency sufficient to prevent undue setting of the solids which form a paste therewith. As also pointed out in Patent No. 2,594,313, the vehicle should preferably have a Conradson residue of .5% or lower, so that carbonaceous deposits originating on decomposition of the vehicle can be scavenged by means of small amounts of oxidizing agents. Extended discussion of these attributes of the vehicle is given in the Klinker patents, so that further discussion here seems unnecessary.

The alkaline material which is introduced in the pastes according to the present invention can usually be added in the form of a solution until the paste has attained a stable alkaline content. For most purposes, where sodium hydroxide is used as the alkaline material, a total amount between about .05% and .2% by weight on the copper oxide is adequate to provide a product which will exhibit little corrosion of iron containers during a period of up to six months. This period of time has been found to be ample under present conditions of distribution and use since most stocks are presently renewed by the user within such period where the paste employs an aqueous vehicle, or where the paste includes an emulsified aqueous phase, the alkaline material can be added until the paste or aqueous phase has a pH between about 8–10. Where the alkaline material is volatile at room temperatures, higher pH values corresponding to greater total quantity of alkaline material may be needed in the fresh paste in order to ensure a residual content throughout the projected life of the batch. It is within the ability of one skilled in the art to determine how much alkaline material should be introduced in a particular batch of paste to take care of expected losses of material due to volatility. In any case, it will be apparent that the total quantity of alkaline material will always be small and on the order of a fractional part of 1% by weight on the dispersed solids of the paste.

The following examples illustrate the principles and the preferred manner of practicing the invention.

*Example 1*

Prepare 300 lbs. of a vehicle consisting of one hundred parts of ethylene glycol and two hundred parts water. Charge 90 lbs. of the vehicle, 200 lbs. of minus 200 mesh copper powder and 17.5 lbs. of sodium carboxymethyl-cellulose (Carbose "I") as a suspending agent to a mixer. Add 2 grams of Silicone Antifoam and 3 lbs. polyethylene glycol tertdodecylthioether (a wetting agent) and agitate until smooth and free of lumps. Alternately add minus 200 mesh copper powder and vehicle until 1100 lbs. of copper powder and approximately 275 lbs. of vehicle have been incorporated. At this stage the paste is slightly on the heavy side. Add a flux solution prepared by heating 5 lbs. potassium nitrate, 2.5 lbs. borax, 2.5 lbs. boric acid and 20 lbs. water to approximately 200° F. until completely dissolved. Then add 1.1 lbs. of sodium hydroxide dissolved in just sufficient water to give a pH of 9. Add remaining vehicle to produce a paste of desired consistency and to bring the paste to a copper content of about 20 lbs. per gallon.

Samples of the above paste were tested for corrosion along with a sample of an identically-proportioned paste having no sodium hydroxide. The test was carried out by weighing a cleaned piece of steel, immersing it in the paste and leaving it there for a period of time, then removing it, cleaning it, reweighing it and reinserting it in the paste. The loss of weight in percentage on the original weight of the piece of steel after various periods of immersion in both samples of paste is shown in the following table:

| Days' Immersion | Percent Loss of Weight in Paste Containing— | |
| --- | --- | --- |
| | No NaOH | .1% NaOH |
| 0 | start of test | |
| 4 | 0.4 | nil. |
| 7 | 0.8 | nil. |
| 10 | 1.1 | nil. |
| 30 | 4.1 | nil. |
| 90 | 10.2 | nil. |

In similar corrosion tests using identically-proportioned pastes, except that the NaOH was replaced with ammonium hydroxide at .2%, 1% and 2% levels by weight on the copper powder, the following results were secured:

| Days' Immersion | Percent Loss of Weight in Paste Containing— | | | |
| --- | --- | --- | --- | --- |
| | No NH₄OH | .2% NH₄OH | 1% NH₄OH | 2% NH₄OH |
| 0 | | start of test | | |
| 6 | 1.11 | .13 | .01 | nil. |
| 13 | 4.21 | .21 | .01 | nil. |
| 24 | 5.30 | .23 | .02 | nil. |
| 26 | 6.63 | .28 | .03 | .01. |

*Example 2*

A paste without fluxes was prepared by adding 2.6 lbs. of Keltex (an alginate suspending agent) to 85 lbs. of ethylene glycol with vigorous agitation to prevent agglomeration. When the suspending agent had been thoroughly dispersed, 175 lbs. of water was added with agitation to give a vehicle of uniform consistency. One hundred lbs. of this vehicle was charged to a mixer and 3.75 lbs. of Emcol 7100 wetting agent was added with agitation. Then cuprous oxide and vehicle were charged alternately until 1320 lbs. of cuprous oxide and approximately 230 lbs. of vehicle had been incorporated. The paste was slightly on the heavy side. 2.64 lbs. of sodium hydroxide dissolved in water was added to bring the batch to a pH of 9. The remaining vehicle was then added to thin the paste to desired consistency and to bring the cuprous oxide content to about 20 lbs. per gallon.

Comparable sample batches were prepared for use in corrosion tests, one batch being identical with the above except to omit the sodium hydroxide, and another being identical except to include .2% (2.64 lbs.) of NH₄OH in addition to the .2% of sodium hydroxide.

The corrosion tests were conducted in the manner described in Example 1, with the following results:

| Days' Immersion | Percent Loss of Weight in Paste Containing— | | |
| --- | --- | --- | --- |
| | No NaOH | .2% NaOH | .2% NaOH, .2% NH₄OH |
| 0 | | start of test | |
| 3 | 11.3 | nil | nil. |
| 13 | 45.7 | nil | nil. |
| 46 | none left | nil | nil. |
| 77 | | nil | nil. |
| 167 | | nil | nil. |

In another test using comparable pastes made with 90% copper powder-10% tin powder in place of the cuprous oxide, and containing no sodium hydroxide in one and .05% NaOH (by weight on the copper-tin) in the other, the following results were determined:

| Days' Immersion | Percent Loss of Weight in Paste Containing— | |
| --- | --- | --- |
| | No NaOH | .05% NaOH |
| 0 | Start of test | |
| 15 | 0.1 | nil. |
| 28 | 0.2 | nil. |
| 56 | 0.3 | nil. |
| 84 | 0.4 | nil. |

*Example 3*

A paste analogous to the one described in Example 1 of Klinker Patent 2,594,313 was prepared from a hydrocarbon vehicle composed of one part of a synthetic hydrocarbon jelly-like material having a Conradson carbon of .19% and an A.P.I. gravity of 33.0, and 4 parts of a synthetic polymeric heat-depolymerizable hydrocarbon oil of Conradson carbon of .01%. The resulting vehicle had the following properties:

A.P.I. gravity _____ degrees__ 32.0
Pour point _____ do____ 115
Flash _____ ° F__ 330
Fire _____ ° F__ 375
Viscosity at 210° F. (S.U.) _____ seconds__ 51
Conradson carbon _____ percent__ .16

One hundred ten lbs. of the vehicle was charged to a mixer along with 4 lbs. of Emcol 7100 wetting agent and 330 lbs. cuprous oxide, and the whole mass was thoroughly mixed. A flux solution prepared by dissolving 8 lbs. of potassium nitrate, 4 lbs. borax and 4 lbs. boric acid in 20 lbs. of water heated to approximately 200° F. was added along with 1.25 lbs. of Emargol emulsifying agent which had been dissolved in 35 lbs. of water heated to approximately 180° F. The mass was agitated to emulsify the flux solution, after which 1320 lbs. of cuprous oxide was added incrementally along with 55 lbs. of ethylene glycol. Thorough mixing brought the mass to a paste of uniform consistency. A sample of the paste was removed for use in corrosion tests, and the remainder was mixed with sodium hydroxide solution until .15% NaOH by weight on the cuprous oxide had been incorporated. The resulting alkaline paste was also tested for corrosion, with the following results:

| Days' Immersion | Percent Loss of Weight in Paste Containing— | |
|---|---|---|
| | No NaOH | .15% NaOH |
| 0 | Start of test | |
| 7 | .34 | nil. |
| 12 | .76 | nil. |

From the foregoing examples it will be clear that when one finds a brazing paste to be corrosive to ferrous metals, he can apply the principles of the present invention to overcome such corrosive tendencies, and it will be clear that the expense involved in doing so is apt to be negligible since it is only necessary to neutralize the paste and then add enough additional alkaline material to ensure the presence of a stable, enduring excess. Some pastes may not be as corrosive as others, and some pastes may require more base to establish a permanent and stable alkaline content, but it is within the ability of one skilled in the art to determine the amount of alkaline material which any particular paste required in order to establish a stable alkaline content therein.

The principles of my invention can, of course, be applied to non-aqueous brazing pastes of the type described in the Klinker Patent 2,566,339 by dispersing a small amount of dry alkaline material in the hydrocarbon vehicle. The presence of such dispersed base assures an alkaline pH in any aqueous phase which may occur as a result of the condensation of moisture from the surrounding atmosphere, or which may occur from other contact of adventitious moisture with the paste.

It will be apparent that the principles herein set forth can be applied to a multitude of specifically different formulations and types of brazing pastes and that many variations will occur to those skilled in the art. Thus, finely divided iron powder can be included in cuprous brazing pastes for the purposes set forth in the Klinker Patent No. 2,606,132. Also, non-corrosive pastes can be prepared which utilize any of the common brazing and/or soldering metals or alloys of the types described in the Klinker patents supra, thus adapting the pastes for use in joining any of the structural metallic materials presently available in commerce. Such metals and/or alloys, or compounds which are capable of being reduced to the desired metals and/or alloys under the temperature and atmosphere conditions of the brazing operation, should of course be in powdered form and of a fineness conducive to the preparation of a paste which is of fairly uniform composition.

Having now described my invention, what I claim is:

1. In a furnace-brazing paste of the type wherein powdered particles of commercial grade copper oxide are mixed with a gel vehicle to make a paste therewith, and wherein chlorides which contaminate said copper oxide and other acidic materials of said paste induce corrosion of ferrous metal and of ferrous containers in which said paste is packaged, the improvement which consists in having present in such a paste a small quantity of disseminated, unneutralized alkali-metal alkaline material sufficient to impart a stable alkaline pH to said paste.

2. An improved brazing paste as claimed in claim 1 wherein the alkaline material is sodium hydroxide and wherein the quantity thereof which is unneutralized is sufficient to impart a pH between 8 and 10 to said paste.

3. A paste as claimed in claim 1 wherein the quantity of alkaline material corresponds to about .05–.2% by weight on the copper oxide.

4. A paste as claimed in claim 3 wherein the gel vehicle is an organic gel of heat-depolymerizable synthetic hydrocarbon polymer.

References Cited in the file of this patent

UNITED STATES PATENTS

| | | |
|---|---|---|
| 647,632 | Pich | Apr. 17, 1900 |
| 804,664 | Leisel | Nov. 14, 1905 |
| 2,547,771 | Pessel | Apr. 3, 1951 |
| 2,566,339 | Klinker | Sept. 4, 1951 |
| 2,594,313 | Klinker | Apr. 29, 1952 |
| 2,606,132 | Klinker | Aug. 5, 1952 |